(12) United States Patent
Huang

(10) Patent No.: US 12,371,082 B1
(45) Date of Patent: Jul. 29, 2025

(54) FOLDABLE TROLLEY WITH THREE WAY BASE CONNECTIONS

(71) Applicant: Deyi Shenzhen Logistics Co., Ltd., Shenzhen (CN)

(72) Inventor: Yi Huang, Guangzhou (CN)

(73) Assignee: Deyi Shenzhen Logistics Co., Ltd., Shenzhen (CN)

( * ) Notice: Subject to any disclaimer, the term of this patent is extended or adjusted under 35 U.S.C. 154(b) by 0 days.

(21) Appl. No.: 18/661,635

(22) Filed: May 12, 2024

(51) Int. Cl.
  *B62B 1/12* (2006.01)
  *B62B 5/06* (2006.01)

(52) U.S. Cl.
  CPC .............. *B62B 1/125* (2013.01); *B62B 5/065* (2013.01)

(58) Field of Classification Search
  CPC .. B62B 1/125; B62B 1/00; B62B 1/10; B62B 1/12; B62B 1/26; B62B 1/266; B62B 5/00; B62B 5/065; B62B 5/06; B62B 5/064; B62B 2202/22; B62B 2202/26; B62B 2202/404; B62B 2202/66
  See application file for complete search history.

(56) References Cited

U.S. PATENT DOCUMENTS

| | | | | |
|---|---|---|---|---|
| 3,041,026 A | * | 6/1962 | Wilson | B62B 1/12 280/654 |
| 3,754,771 A | * | 8/1973 | Shagoury | B65B 67/1205 280/654 |
| 3,858,899 A | * | 1/1975 | Bontrager | B62B 1/208 280/641 |
| 3,892,429 A | * | 7/1975 | dit Dalmy | B62B 1/125 280/654 |
| 4,570,958 A | * | 2/1986 | Walker | B62B 1/12 280/47.131 |
| 4,896,897 A | * | 1/1990 | Wilhelm | B62B 1/125 280/655 |
| 4,917,393 A | * | 4/1990 | Rogers | B62B 1/12 248/129 |
| 5,209,517 A | * | 5/1993 | Shagoury | B62B 1/26 280/654 |
| D352,145 S | * | 11/1994 | Server Perez | D34/25 |
| 5,630,602 A | * | 5/1997 | Vanderslice | A45C 5/14 280/47.2 |

(Continued)

OTHER PUBLICATIONS

Kedsum, Kedsum 2 in 1 Shopping Cart with Wheels, 330 lbs Grocery Cart, Portable Utility Dolly Cart, Heavy Duty Luggage Cart, Foldable Hand Truck with a Black Removable Waterproof Bag for Moving, Camping, Inventor started the first sale of this product Apr. 24, 2024. Date on May 8, 2024. The link of the sale: https://www.amazon.com/dp/BOCP9D1KFW?ref-myi_title_dp.

*Primary Examiner* — James M Dolak
(74) *Attorney, Agent, or Firm* — Hawaii Patent Services; Nathaniel K. Fedde; Kenton N. Fedde

(57) ABSTRACT

The present invention introduces a novel foldable trolley design that addresses the limitations of traditional trolleys. The trolley is designed to efficiently transport both light and heavy objects, and its innovative L-shaped jointer allows for easy folding and storage. The connected base, foot, and supporting stick simplifies the folding process, prevents unexpected foot folding, and maximizes storage efficiency. Ideal for limited space environments, the trolley provides improved stability, safety, and versatility. This invention revolutionizes the foldable trolley, offering a practical solution for storage and transportation needs.

16 Claims, 5 Drawing Sheets

(56) References Cited

U.S. PATENT DOCUMENTS

| | | | | |
|---|---|---|---|---|
| 8,317,219 | B2 * | 11/2012 | Bruce | B62B 1/266 |
| | | | | 280/654 |
| 8,646,805 | B2 * | 2/2014 | Goldszer | B62B 1/12 |
| | | | | 280/30 |
| 8,794,252 | B2 * | 8/2014 | Alghazi | A61G 7/1019 |
| | | | | 135/66 |
| 8,888,054 | B1 * | 11/2014 | Peterson | B62B 1/266 |
| | | | | 280/654 |
| 9,233,700 | B1 * | 1/2016 | Elden | B62B 1/266 |
| 9,604,658 | B2 * | 3/2017 | Kassab Arabo | B62B 3/00 |
| 9,914,468 | B2 * | 3/2018 | Coules | B62B 3/106 |
| 11,110,948 | B2 * | 9/2021 | Song | B62B 5/067 |
| D942,107 | S * | 1/2022 | Ren | D34/24 |
| 12,103,575 | B2 * | 10/2024 | Green | B62B 1/264 |
| 12,111,618 | B1 * | 10/2024 | Hufford | B62B 5/00 |
| 12,134,418 | B2 * | 11/2024 | Petrovich | B62B 3/1464 |
| 12,157,510 | B2 * | 12/2024 | Delgado Ortega | B62B 1/14 |
| 12,202,532 | B2 * | 1/2025 | Elden | B62B 1/12 |
| 12,233,926 | B2 * | 2/2025 | Su | B62B 5/066 |
| 12,233,930 | B1 * | 2/2025 | Wan | B62B 3/02 |
| 12,246,767 | B1 * | 3/2025 | Wan | B62B 3/02 |
| 2002/0043544 | A1 * | 4/2002 | Caneba | F16B 7/0493 |
| | | | | 224/584 |

* cited by examiner

FOLDABLE TROLLEY WITH THREE WAY BASE CONNECTIONS

TECHNICAL FIELD

The present invention generally relates to the field of trolley cart design, and more particularly to techniques for easy folding and compact storage. The invention is directed towards improving the versatility and convenience of trolleys by providing a three-way base connection system that allows for greater flexibility in usage and transportation.

The present invention relates to the field of trolley design, which has remained largely unchanged over the years. Traditional trolleys are often bulky and inflexible, making them difficult to store and transport. As a result, there is a need for a more compact and versatile trolley that can be easily folded and stored in tight spaces.

BACKGROUND

Conventional trolleys have a fixed base connection system that limits their flexibility and makes them difficult to maneuver in tight spaces. These trolleys often require a dedicated storage area, which can be inconvenient for users who need to move their trolley frequently.

The prior art does not provide a solution that addresses these issues. Existing foldable trolleys have limited versatility and are often cumbersome to use due to their design. Therefore, there is a need for a more efficient and practical trolley design that can meet the needs of users in various settings.

The foldable trolley has been a staple in households and workplaces for decades, providing an efficient way to transport heavy objects. However, current designs have several limitations that hinder their versatility and convenience. Traditional trolleys often require a dedicated storage area, which can be inconvenient when space is limited. Moreover, folding these trolleys can be cumbersome, as the foot of the base is typically not designed to fold with the rest of the trolley. This can lead to accidents, such as the foot folding up unexpectedly and causing the object on the base to fall.

The current state of the art in foldable trolleys has evolved to include trolleys with foldable bags that can carry small items. However, these trolleys often lack sufficient support for heavier objects, leading to instability and potential falls. Additionally, the foot of the base is still not designed to fold with the rest of the trolley, causing inconvenience and safety concerns.

SUMMARY

The objective of the present invention is to overcome these limitations by providing a foldable trolley that can easily accommodate both heavy and light objects while preventing accidents and saving space. By connecting the base, foot, and supporting stick together, the foot of the base can be automatically folded with the rest of the trolley during folding, eliminating the need for cumbersome manual folding techniques. This invention achieves this purpose through an L-shaped jointer that supports the base on top and is connected to its foot below. The supporting stick is installed on the body of the L-shaped jointer, allowing for rotational connections that enable easy folding and storage. The present invention addresses the following disadvantages associated with traditional foldable trolleys: Inconvenience caused by a dedicated storage area: The present invention allows users to store their trolley in tight spaces without sacrificing versatility. Difficulty in folding the foot of the base: By connecting the foot, base, and supporting stick together, the present invention eliminates the need for cumbersome folding techniques, ensuring that the foot of the base is safely secured during storage. Safety concerns caused by unexpected foot folding: The L-shaped jointer in the present invention provides additional support to prevent the foot of the base from folding up unexpectedly, protecting the objects on the base from falling.

It is therefore an objective of the present invention to provide a foldable trolley that can accommodate both heavy and light objects while preventing accidents and saving space. By connecting the base, foot, and supporting stick together, the present invention eliminates the need for cumbersome manual folding techniques and provides a safer and more convenient way to transport heavy objects.

By providing a three-way base connection system, the present invention overcomes the limitations of traditional trolleys and offers greater versatility and convenience. This invention allows users to easily fold and store their trolley in tight spaces, making it ideal for use in homes, offices, and other environments where space is limited.

One aspect of the present invention relates to a foldable trolley comprising a base connected with a frame, wherein the base is supported by at least one L-shape jointer, and the L-shape jointer also connects to a foot. The technical advantages of this arrangement include Automatic folding of the foot during storage, eliminating the need for cumbersome manual techniques. Additional support provided by the L-shape jointer to prevent the foot from folding up unexpectedly, protecting objects on the base from falling. Improved stability and safety when transporting heavy objects.

When folding the trolley, only need to hold the base, and the supporting stick will automatically pull up or fold the foot, achieving this purpose through an L-shaped jointer. The L-jointer supports the base on top and is connected to its foot below. The supporting stick is installed on the body of the L-shaped jointer.

All connections can be rotated, so when the base is folded, the supporting stick will automatically pull up or fold the foot.

In this arrangement, the base, foot, and supporting stick are connected, one aspect of the present invention relates to a foldable trolley comprising a base connected with a frame, wherein the base is supported by at least one L-shape jointer, and the L-shape jointer also connects to a foot. This arrangement provides several technical advantages: Automatic folding of the foot during storage, eliminating the need for cumbersome manual techniques. Additional support provided by the L-shape jointer to prevent the foot from folding up unexpectedly, protecting objects on the base from falling. Improved stability and safety when transporting heavy objects.

When folding the trolley, only need to hold the base, and the supporting stick will automatically pull up or fold the foot, achieving this purpose through an L-shaped jointer. The L-jointer supports the base on top and is connected to its foot below. The supporting stick is installed on the body of the L-shaped jointer. All connections can be rotated, so when the base is folded, the supporting stick will automatically pull up or fold the foot.

In this arrangement, the base, foot, and supporting stick are connected. So, when it is folded, you only need to hold the base, and you can automatically fold its foot. This supporting stick not only has this function but also can help the base withstand a certain pressure, another benefit is that it prevents the foot from tilting or folding itself, because when the items on the base are too heavy, many times this foot will fold up by itself. We have achieved this purpose through an L-shaped jointer. The L-jointer supports the base on top and is connected to its foot below. The supporting stick is installed on the body of the L-shaped jointer. All connections can be rotated, so when the base is folded, the supporting stick will automatically pull up or fold the foot.

This technical advantage makes this trolley more convenient and safer for use. Independent claim 1: A foldable trolley comprising a base connected to a frame by a rotatable bolt; a supporting stick connected to the base by a tube so the foot can plug-in; a folding bar has two ends, one end of the folding bar connects the body of L-shape jointer and another end of the folding bar connects between the frame and a wheel.

Our design provides a three-way base connection that can be easily folded and stored in small spaces, while maintaining stability and balance during transportation. The supporting stick helps to prevent the foot from tilting or folding itself, and also can help the base withstand certain pressure. By using a tube for the foot, you only need to hold the base when it is folded up, and the foot will automatically plug-in, reducing the amount of force needed to hold the trolley together. Additionally, by connecting the support stick to the body of L-shape jointer, it can prevent the foot from tilting or folding itself, because when the items on the base are too heavy, many times this foot will fold up by itself.

The folding bar allows for easy transportation and storage of the trolley, as well as providing a means of connecting the body of L-shape jointer to the frame and wheel. The two ends of the folding bar can be easily connected to the frame and wheel, allowing for easy movement and stability. By using this mechanism, it is possible to transport heavy items without the need for additional support, making the trolley more versatile and convenient to use.

Overall, our design provides a simple and effective solution for a foldable trolley that can be easily transported and stored, while maintaining stability and balance during transportation. The three-way base connection and supporting stick help to ensure that the trolley remains stable even when folded up, while the folding bar allows for easy movement and storage. These technical advantages make our design an ideal solution for a wide range of applications.

DETAIL DESCRIPTION OF EMBODIMENTS OF THE PRESENT INVENTION

Figure 1:
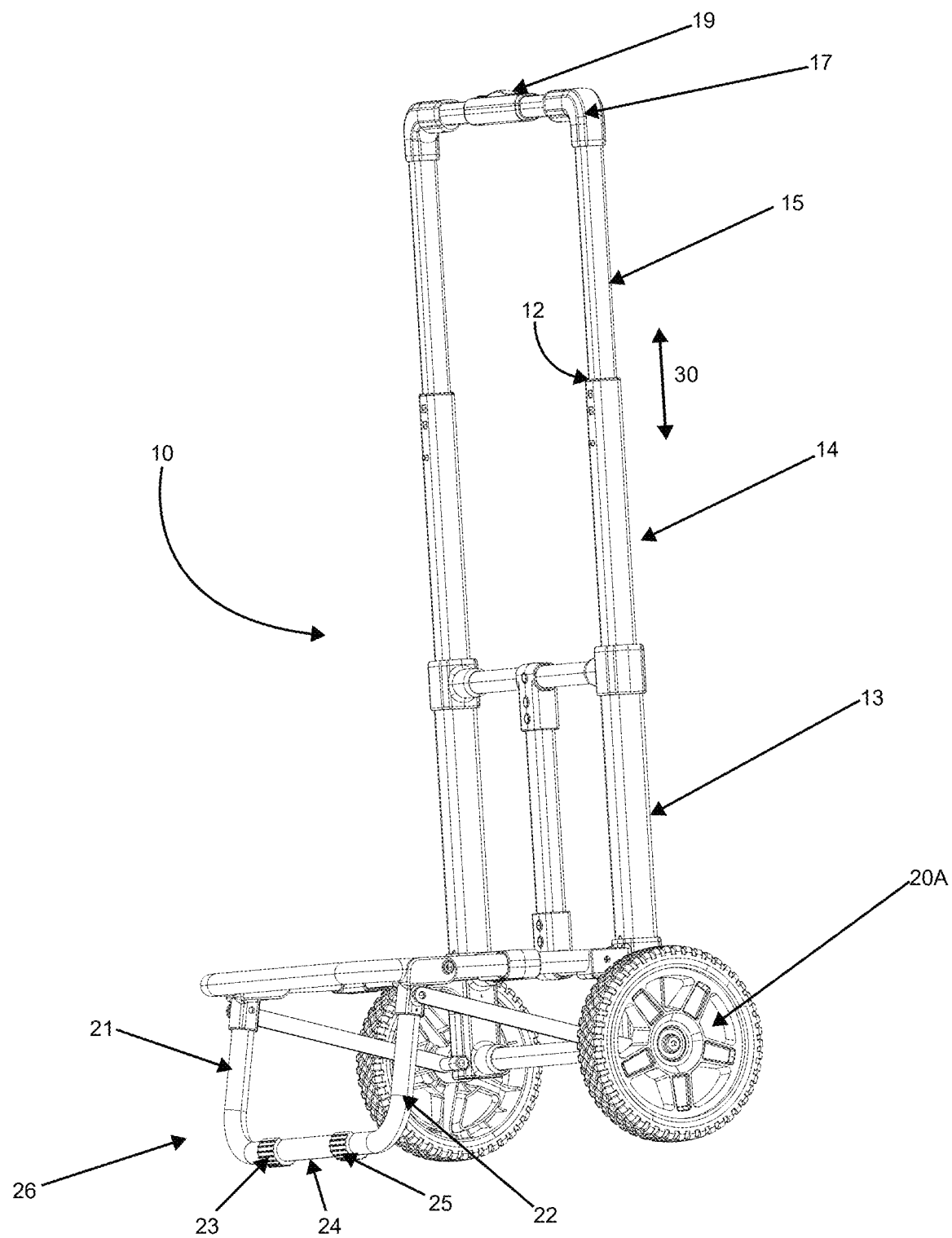
FIG. 1 is a side view of the present invention trolley, illustrating the trolley in the standing fully erect condition

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying Figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein where the mechanical wallet is in a closed position with the first plate generally horizontal and below the second plate without cards protruding out of the second end of the mechanical wallet (and misaligning the card lock from the frame rail that the card lock is at the second end of). Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

In FIG. 1, The cart 10 includes foot section 26 made of one piece including a bottom horizontal section 24 respectively extending on both its left side and right side, the left side extending to arcuate section 22 which in turn extends to elevated horizontal section and the right side extending to arcuate section 21 which in turn extends to elevated horizontal section. Bottom horizontal section 24 also includes a pair of stabilizing clips 23 and 25 wrapped around section 24.

The handle 12 of FIG. 1 consists of nesting telescoping portions 13, 14 and 15, with a central grip portion 17 having an actuator button 19. Depressing the actuator button 19 releases a mechanism holding the handle portions in position, enabling the handle to be collapsed as shown in FIG. 1

Referring to FIG. 1 the present invention cart 10 has a pair of oppositely disposed large bumper wheels (beefy wheels) 20A' and 20B' with large rubber tires 20A and 20B, the benefit of the large bumper wheels (beefy wheels) 20A and 20B is they facilitate the cart carrying a heavy load and enable the cart 10 to be rolled over uneven surfaces such as sand, stairs, cobblestones, etc. in addition to level surfaces such as a parking lot or street.

The present invention is illustrated in its fully erect standing condition in FIG. 1. The left and right portions of the cart are described from a point of view standing behind the cart. Some of the components are more clearly illustrated in FIG. 2.

Figure 2:
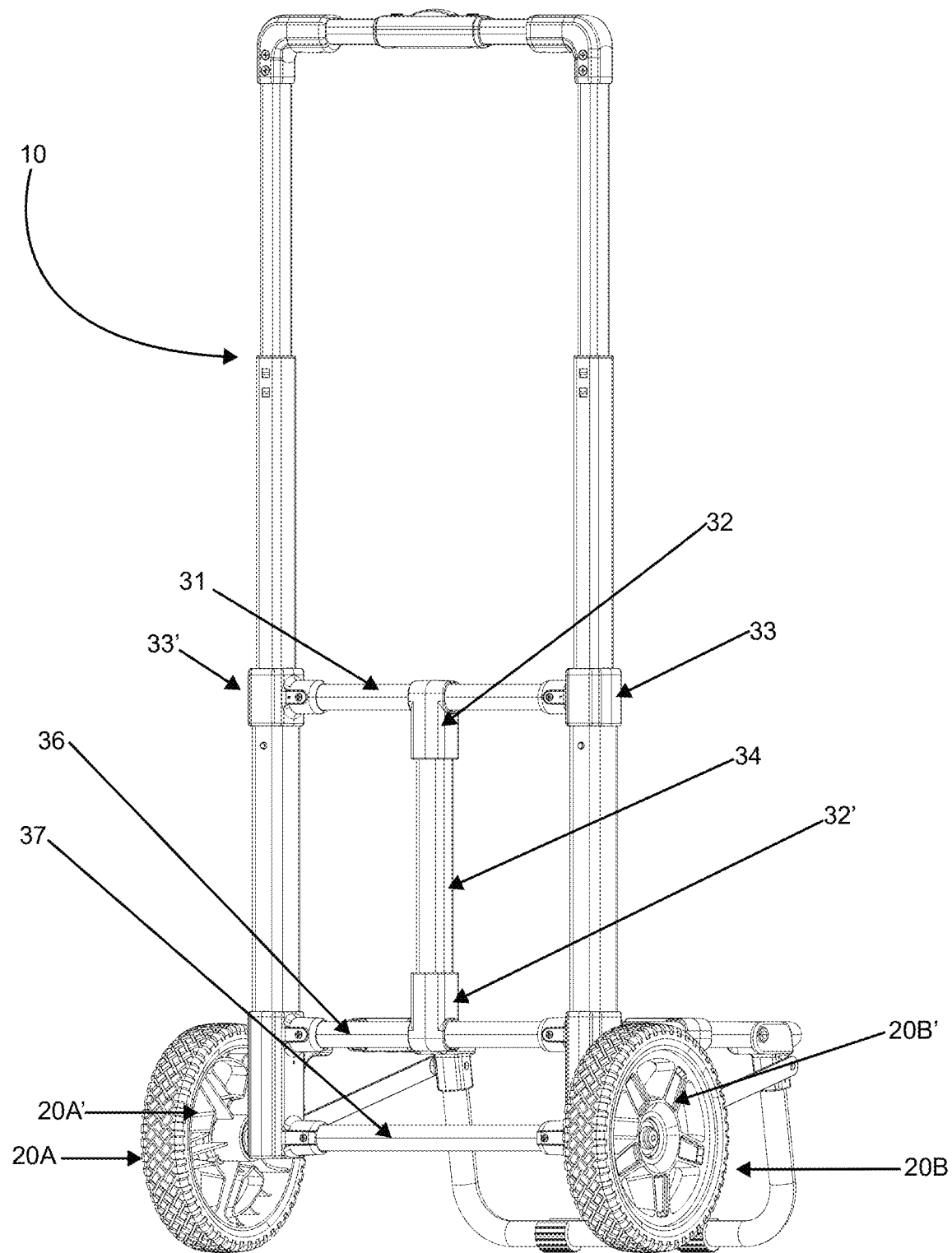
FIG. 2 is a back view of the present invention trolley, illustrating the trolley in the standing fully erect condition

In FIG. 2, the structure of the trolley is primarily composed of several metal bars numbered 36, 37, 34, 31 the combination of 36, 37, 34, 31 are called frame, along with brackets located on both sides, labeled as 13 and 14. A crucial component of the trolley's design is crossbar 31, situated at the top of the frame. This crossbar is securely fastened to brackets 13 and 14 with the assistance of two fixtures, numbered 33 and 33'. These fixtures have been designed with a width that is considerably greater than bracket 14, thus enabling bracket 14 to retract into bracket 13. This feature is particularly advantageous as it permits the trolley to be folded up when not in use, thereby facilitating easier transportation and storage. Crossbar 31 not only provides a sturdy frame for the trolley but also serves as a barrier, preventing smaller items from falling off the trolley.

FIG. 2, Situated below crossbar 31 is another crossbar, numbered 36, which also plays an integral role in maintaining the structural integrity of the trolley. Vertical bar 34 is strategically positioned to connect the middle of crossbars 36 and 31, with fixture 32 providing a secure connection to crossbar 31. The midpoint of bars 36 and 34 is linked by fixture 32'. Crossbar 36, like its counterpart 31, serves a dual purpose. Apart from providing additional structural support, it indirectly connects to the base 41 of the trolley, as it links to bracket 13, which in turn, connects to the base, thereby ensuring the base is securely fixed. The base 41 is a U-shape metal bar that the two end of the U-shape connected to the base support 39 in FIG. 4.

The trolley frame's lowest crossbar, labeled 37, extends the trolley's functionality beyond just providing structural stability. It is designed to be stepped on, a feature that proves immensely useful when the trolley needs to be tilted. This is a common requirement during usage, where the trolley often needs to be tilted and all the force is exerted on two wheels, 20A and 20B. As such, crossbar 37 enhances the ease with which the trolley can be tilted.

The foldable trolley, designated as number 10, is comprised of a sturdy base, assigned the number 41. This base is connected to a frame, which is meticulously constructed from a series of metal bars. These bars are identified by the numbers 36, 37, 34, and 31. In order to provide adequate support to the base 41, there is at least one L-shaped jointer, referenced as 43. This jointer is uniquely composed of two components, labelled as 43' and 43".

Figure 3:
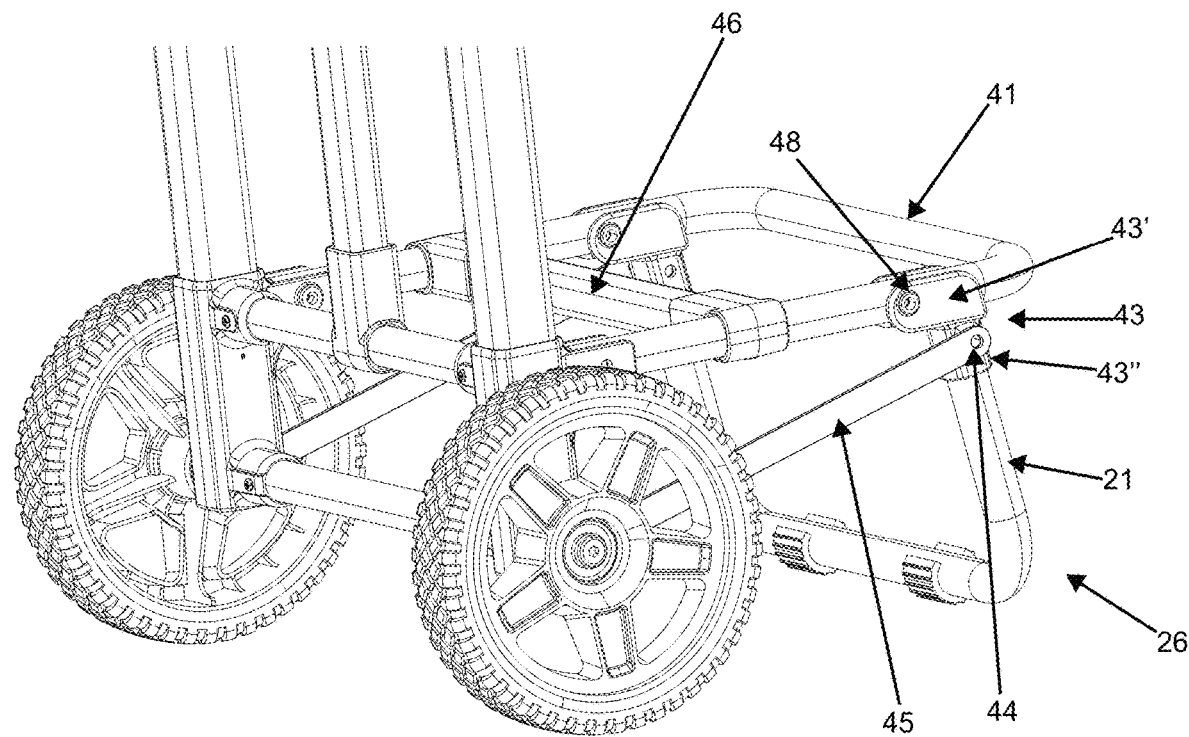
FIG. 3 is a side view of the present invention trolley, show the relationship on the base, foot, and the L-shape jointer.

In FIG. 3, The L-shape jointer 43 is ingeniously designed to connect to a foot, precisely the left side, which extends to the arcuate section, marked as 21. This connection ensures the stability and balance of the trolley while in use.

In FIG. 3, The L-shape jointer 43 is a marvel of design with one side constructed as a U-shape support, recognized as 43', that is dedicated to supporting the base 41. The other end of the L-shape jointer 43 is a tube, marked as 43", which is designed to allow the 21 to plug-in seamlessly. The components 43' and 43" are not static, but can be moved or rotated when the trolley is folded, adding to the versatility of this innovative design.

The U-shaped support, identified as 43' in FIG. 3, is attached to the base 41 via bolt 48. This bolt allows it to rotate. When 41 is moved upward, it partially shifts outside the U-shape but remains connected to 48. The U-shaped support, labeled as '43', functions like a clamp. The base, denoted as '41', can be popped in or out of this U-shaped support.

In FIG. 3, Attached to the trolley is a folding bar, numbered 45, that features two ends. One end of the folding bar 44 is cleverly connected to the body of the L-shape jointer 43" by a rotatable bolt, numbered 44. This bolt, along with one end of the folding bar, are both referred to as 44 for the purpose of this description.

In FIG. 3, Rotation is a key feature in this design. The bolt, 44, can rotate, and the connection between 43' and 43" is also capable of rotation. This feature is particularly useful when the user pulls up 41, Foot26 is simultaneously retracted because the folding bar 45 manipulates 21 via 43". This means that when folding the trolley, the user simply needs to pull up 41 to achieve a labor-saving process.

Another significant advantage of this design is the role of 45 as a fixation point. This is particularly useful when the trolley is laden with heavy items, which often causes 26 to fold up on its own. In this situation, it can be challenging for a person to restore it to its original position, as it requires bending down, holding 21 or 26 with their hands. This can be a very inconvenient process. However, with the presence of the 45, 21 or 26 can be fixed in place, ensuring that even if there are heavy objects on top, they will not fold up due to the weight on base 41, thereby preventing any inconvenience.

Figure 4:
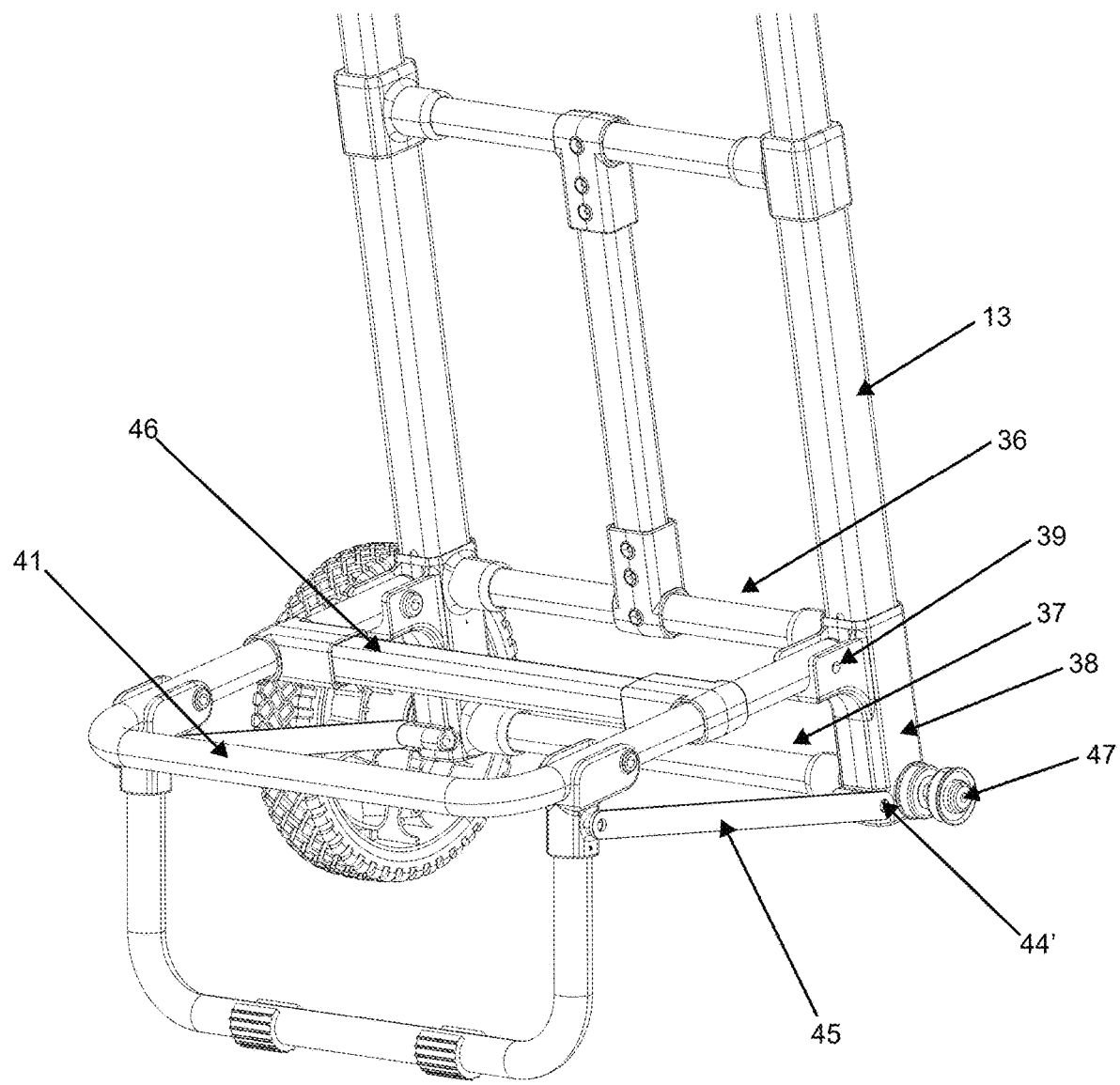
FIG. 4 is another side view of the present invention trolley, wheel removed.

As illustrated in FIG. 4, an additional end 44' of the folding bar 45 forms a connection between the frame—comprised of elements 36, 37, 34, 31—and wheel 20B using a bottom connector 38. This bottom connector 38 not only acts as a support for the base 41 but also accommodates the top receiving side bar 13 and the protruding element 39, which support the base 41.

The base 41, which is fashioned from a U-shaped metal bar, has its ends connected to the protruding element 39. To enable the base 41 to accommodate and support heavy objects, a movable bar 46 is strategically positioned to connect the two sides of the base 41. 46 is movable along two side of base 41.

Additionally, the bottom connector 38 has two receivers on the side to receive cross bar 36 and 37 and it forms a connection at its lower end to one end of the folding bar 44'.

To secure wheel 20B to the bottom connector 38, a jointer 47 is employed along with a long bolt, which, for the sake of clarity, is not depicted in the figure. The design is such that when base 41 is hoisted upwards, it prompts the folding bar end 44' to rotate, leading to the folding upwards of foot 26 by a pulling force since 44 is connected to foot 26.

In the frame shown in FIG. 4, which is made up of parts 36, 37, 34, 31, there are two crossover bars denoted as 36 and 37. One of these bars plays a pivotal role in connecting the two wheels to enable tipping. The other bar is involved in securing the frame. The base 41 has a connection with the frame via protruding element 39. there is also a bolt in 39, which connects to one end of U-shape base 41, also allows the base 41 to rotate upwards. This rotation is particularly advantageous as it facilitates space-saving when the frame is folded.

Figure 5:
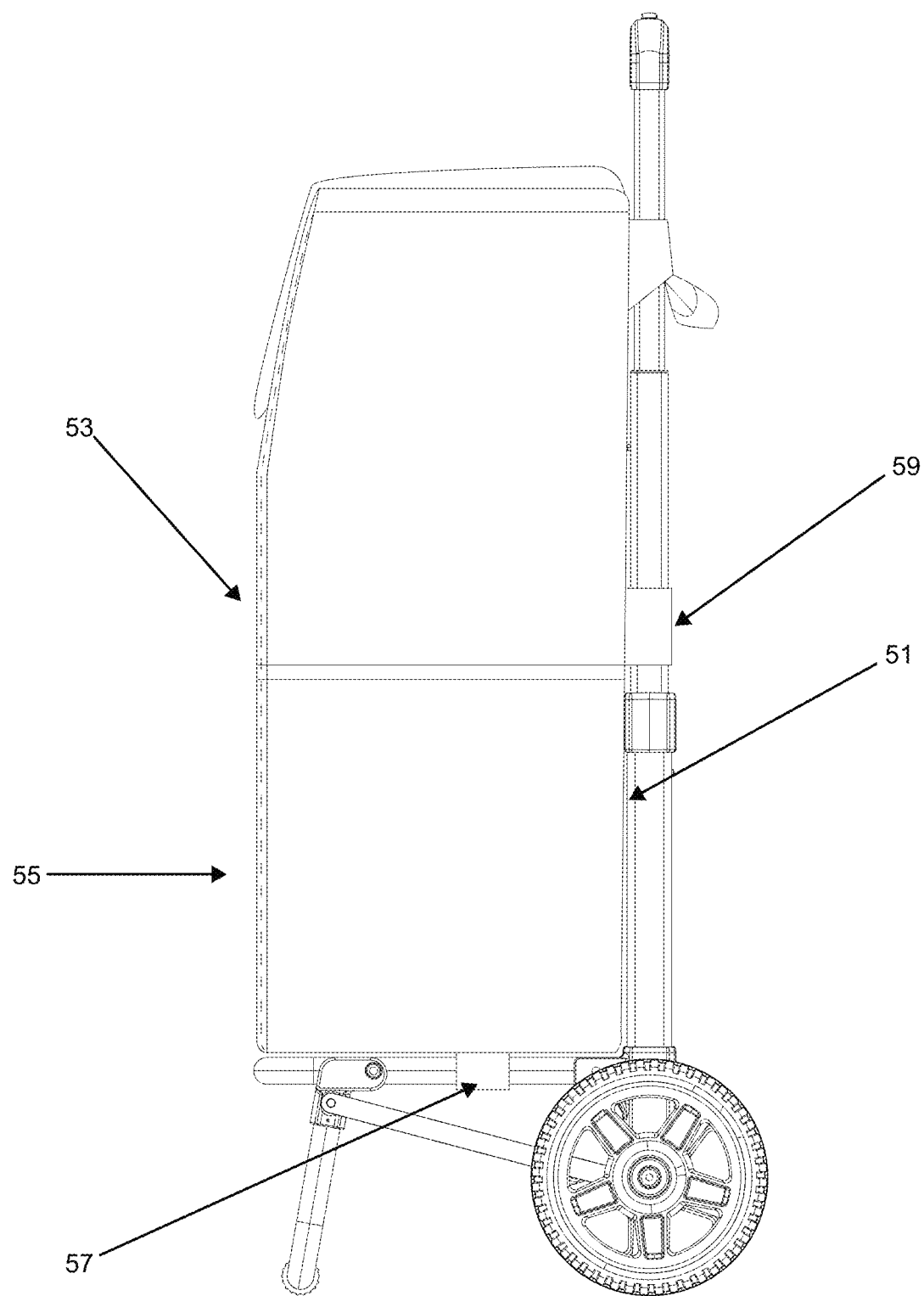
FIG. 5 is a side view of the bag of present invention trolley, which the bag can be put on the trolley's base.

As an optional feature, as demonstrated in FIG. 5, a bag can be conveniently positioned on the base 41. To provide structure and stability to the bag, at least two boards, designated as 53 and 55 in FIG. 5, are installed inside it. These boards are strategically placed at the front and the back of the bag to give it a robust structure, helping it to retain its shape and withstand the weight of the items placed inside. Moreover, provide a guideline when folding.

When the bag is not in use or needs to be stored, it can be easily folded, with the fold line neatly falling between the two boards at the front of the bag. This smart design enables the bag to fold compactly while maintaining its integrity, making it a practical addition to the trolley.

In FIG. 5, additional features of the bag are highlighted. There is a strap, marked as 57, securely attached to the bottom of the bag. This strap can be conveniently fastened on the top of base 41. This design ensures that the bag remains securely in place when the trolley is in motion, preventing it from falling off and ensuring the safe transportation of items.

Moreover, there is another strap, marked as 59, positioned at the rear of the bag. This strap can be tied onto the trolley frame, adding another layer of security to the bag's positioning. This feature not only keeps the bag firmly in place but also prevents it from swaying from side to side when the trolley is moving. This swaying can disrupt the balance of the trolley and make it harder to maneuver, but this design effectively eliminates that issue, making the trolley easy and efficient to use.

The invention claimed is:

1. A foldable trolley comprising:
    a base connected with a frame, wherein the base is supported by two L-shape jointers, wherein the two L-shape jointers are connected to a foot;
    wherein one side of each of the two L-shape jointers is a U-shape support to support the base, and another side of each of the two L-shape jointers is a tube into which the foot can be inserted to provide said connection of the two L-shape jointers and the foot;
    wherein the frame has three cross-over bars;
    wherein the frame comprises two side bars and two bottom connectors, each of the two bottom connectors connected to a respective side bar of the two side bars,
    wherein each of two of the three cross-over bars are connected to an inward-facing side of each of the two bottom connectors;
    wherein a first wheel is connected to an outward-facing side of one of the two bottom connectors, and a second wheel is connected to an outward-facing side of the other of the two bottom connectors;
    wherein the frame has two folding bars, wherein each of the two folding bars has two ends, wherein one of the two ends of each of the two folding bars is configured to be able to connect to a body of one of the two L-shape jointers by a rotatable bolt and another end of each of the two folding bars is connected to one of the two bottom connectors, respectively;
    wherein each of the two bottom connectors is disposed between the first wheel and the second wheel.

2. The foldable trolley of claim 1, wherein the base connects to the frame by a base support on which the base can rotate upward when in an unfolded position of the trolley.

3. The foldable trolley of claim 1, wherein the top of the frame has a handle, which can be extended to extendable height.

4. The foldable trolley of claim 1, wherein a bag is placed on the base and at least two boards installed inside the bag, and they are located in a front portion of the bag.

5. The foldable trolley of claim 1, wherein a bag is placed on the base and at least two boards installed inside the bag, there is at least one board located in a front portion of the bag.

6. The foldable trolley of claim 1, wherein the U-shape support is removable, the base can pop-in or pop-out from the U-shape support.

7. The foldable trolley of claim 1, wherein a third cross-over bar of the three cross-over bars is positioned above the other two cross-over bars and connected to each of the two side bars.

8. The foldable trolley of claim 7, wherein the two cross-over bars comprise an upper cross-over bar and a lower cross over bar,
    wherein the frame further comprises a vertical bar connected at one end to the third cross-over bar and at another end to the upper cross-over bar.

9. The foldable trolley of claim 8, wherein the vertical bar is parallel with the two side bars.

10. The foldable trolley of claim 1, wherein each of the two bottom connectors is connected to a respective one of the two folding bars.

11. The foldable trolley of claim 1, wherein each of the two bottom connectors comprises two receivers for insertably receiving respective ends of each of the two cross-over bars to provide said connection of the two cross-over bars to the inward-facing side of the two bottom connectors.

12. The foldable trolley of claim 1, wherein each of the two bottom connectors comprises a protruding element that provides a base support on which the base can rotate upward when in an unfolded position of the foldable trolley.

13. The foldable trolley of claim 12, wherein each of the two bottom connectors is connected to a respective one of the two folding bars.

14. The foldable trolley of claim 13, wherein each of the two bottom connectors comprises two receivers for insertably receiving respective ends of each of the two cross-over bars to provide said connection of the two cross-over bars to the inward-facing side of the two bottom connectors.

15. The foldable trolley of claim 1, wherein the base is a U-shape metal bar comprising two sides, and the foldable trolly further comprises a movable bar movably connected at respective ends to the two sides of the U-shape metal bar such that the movable bar can move along the two sides of the U-shape metal bar.

16. The foldable trolley of claim 1, wherein the two side bars of the frame comprise a first side bar and a second side bar to which each of the three cross-over bars are connected, wherein a first folding bar of the two folding bars is connected between the first side bar and the first wheel, and wherein a second folding bar of the two folding bars is connected between the second side bar and the second wheel.

* * * * *